(12) United States Patent
Egbert

(10) Patent No.: US 6,999,028 B2
(45) Date of Patent: Feb. 14, 2006

(54) ULTRA HIGH FREQUENCY RADIO FREQUENCY IDENTIFICATION TAG

(75) Inventor: William C. Egbert, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 24 days.

(21) Appl. No.: 10/744,657

(22) Filed: Dec. 23, 2003

(65) Prior Publication Data

US 2005/0134506 A1    Jun. 23, 2005

(51) Int. Cl.
*H01Q 21/00* (2006.01)
*H01Q 1/00* (2006.01)

(52) U.S. Cl. .............................. 343/700 MS; 343/725; 343/726; 343/727; 343/728; 343/729; 343/730

(58) Field of Classification Search ................ 343/895, 343/700 MS, 725–730
See application file for complete search history.

(56) References Cited

U.S. PATENT DOCUMENTS

| | | | |
|---|---|---|---|
| 5,182,570 A | | 1/1993 | Nysen et al. |
| 5,771,021 A | | 6/1998 | Veghte et al. |
| 5,963,134 A | | 10/1999 | Bowers et al. |
| 6,037,879 A | | 3/2000 | Tuttle |
| 6,100,804 A | * | 8/2000 | Brady et al. .............. 340/572.7 |
| 6,147,605 A | | 11/2000 | Vega et al. |
| 6,232,870 B1 | | 5/2001 | Garber et al. |
| 6,265,977 B1 | * | 7/2001 | Vega et al. .............. 340/572.7 |
| 6,285,342 B1 | * | 9/2001 | Brady et al. ................. 343/895 |
| 6,304,169 B1 | | 10/2001 | Blama et al. |
| 6,384,727 B1 | | 5/2002 | Diprizio et al. |
| 6,459,588 B1 | | 10/2002 | Morizumi et al. |
| 6,486,780 B1 | | 11/2002 | Garber et al. |
| 6,501,435 B1 | | 12/2002 | King et al. |
| 6,522,308 B1 | | 2/2003 | Mathieu |
| 6,630,910 B1 | * | 10/2003 | Forster et al. .............. 343/806 |
| 6,657,592 B1 | * | 12/2003 | Dening et al. ....... 343/700 MS |
| 6,862,004 B1 | * | 3/2005 | Alexopoulos et al. ...... 343/895 |
| 2003/0091789 A1 | | 5/2003 | Koskenmaki et al. |
| 2004/0217865 A1 | * | 11/2004 | Turner ..................... 340/572.7 |
| 2005/0024287 A1 | * | 2/2005 | Jo et al. ..................... 343/822 |

FOREIGN PATENT DOCUMENTS

| | | |
|---|---|---|
| EP | 0 274 592 | 7/1988 |
| EP | 0 969 547 | 1/2000 |
| JP | 52-52549 | 4/1977 |
| WO | WO 00/10122 | 2/2000 |
| WO | WO 00/21030 | 4/2000 |
| WO | WO 00/26993 | * 5/2000 |

OTHER PUBLICATIONS

Shortley et al., "Elements of Physics", Prentice-Hall, Inc., Englewood Cliffs, NJ, 1971, pp. 690-693.
Horowitz et al., "The Art of Electronics", Cambridge University Press, Cambridge, England, 1980, pp. 29 & 565-568.
Morrow, Ivor L. et al., "Rolled Edge Ultra-wideband Dipole Antenna for GPR Application", IEEE Antennas and Propagation Society International Symposium, 2002 Digest, Jun. 16-21, 2002, New York, NY, vol. 1 of 4, Jun. 16, 2002, pp. 484-487.

* cited by examiner

*Primary Examiner*—Wilson Lee
*Assistant Examiner*—Leith Al-Nazer
(74) *Attorney, Agent, or Firm*—Melissa E. Buss

(57) ABSTRACT

An antenna design for radio frequency identification ("RFID") tags. More particularly, the present invention relates to design for RFID tags particularly operating in the ultra high frequency ("UHF") operating band.

25 Claims, 2 Drawing Sheets

ULTRA HIGH FREQUENCY RADIO FREQUENCY IDENTIFICATION TAG

TECHNICAL FIELD

The present invention relates to antenna design for radio frequency identification ("RFID") tags. More particularly, the present invention relates to design for RFID tags particularly operating in the ultra high frequency ("UHF") operating band.

BACKGROUND OF THE INVENTION

Radio frequency identification ("RFID") has been proposed for use in a number of applications in which an RFID tag is attached to an item and subsequently interrogated or read to obtain information regarding that item. For example, U.S. Pat. Nos. 6,232,870 and 6,486,780, and PCT Publication WO 00/10122 describe various functions and applications for RFID systems, and exemplify the use of RFID tags in libraries. U.S. Pat. No. 5,963,134 also describes certain uses for RFID systems in libraries and for other applications.

The design of a typical RFID tag reflects its origin in the semiconductor and printed circuit board industries. Although functional, the design has a number of features that increase the cost of the finished article and efficiency especially at ultra high frequencies ("UHF"). In a resonant RFID tag, the electrical inductance of an antenna is connected in parallel with a capacitor such that the resonant frequency of the thus-formed circuit is tuned to a prescribed value. In more advanced forms, the circuit of the RFID tag may include an integrated circuit electrically and mechanically bonded to the antenna on a substrate, wherein the voltage induced in/on the antenna by a reader signal provides power to operate the integrated circuit.

Various methods have been developed to design RFID tags, such as disclosed in the following references: U.S. Pat. No. 6,501,435; U.S. Pat. No. 6,100,804; and PCT Publication WO 00/26993.

SUMMARY OF THE INVENTION

One aspect of the present invention provides an ultra high frequency ("UHF") radio frequency identification ("RFID") tag. The UHF RFID tag, comprises: a) a dielectric substrate; b) an antenna attached to the dielectric substrate, where the antenna comprises: i) a first antenna element, where the first antenna element comprises a first conductor and a second conductor, where each conductor has a first end and a second end opposite the first end, where the first antenna element is selected to provide a desired operating frequency range of the antenna; and ii) a second antenna element, where the second antenna element comprises a first portion and a second portion, where the first portion is attached to the second end of the first conductor and the second portion is attached to the second end of the second conductor, and where the second antenna element is selected to provide a desired impedance value of the antenna; and c) an integrated circuit attached to the first end of the first conductor and the first end of the second conductor.

In one preferred embodiment of the above UHF RFID tag, the integrated circuit has a first impedance value, the second antenna element has a second impedance value, the magnitude of the real component of the second impedance value is substantially similar to the magnitude of the real component of the first impedance value, and the magnitude of the imaginary component of the second impedance value is substantially similar to the magnitude of the imaginary component of the first impedance value, and the phase of the imaginary component of the first impedance value and phase of the imaginary component of the second impedance value are opposite. In another aspect of this embodiment, the first impedance value has a first real component value and a first imaginary component value, the second impedance value has a second real component value and a second imaginary component value, the first real component value is substantially similar to the second real component value and the first imaginary component value is substantially similar to the second imaginary component value, where the magnitude of the imaginary component of the second impedance value is substantially similar to the magnitude of the imaginary component of the imaginary component of the first impedance value, and the phase of the imaginary component of the first impedance value and phase of the imaginary component of the second impedance value are opposite. In another aspect of this embodiment, the first impedance value has a first real component value and a first imaginary component value, the second impedance value has a second real component value and a second imaginary component value, where the first real component value is equal to the second real component value and the first imaginary component value is equal to the second imaginary component value, the magnitude of the imaginary component of the second impedance value is equal to the magnitude of the imaginary component of the imaginary component of the first impedance value, and the phase of the imaginary component of the first impedance value and phase of the imaginary component of the second impedance value are opposite.

In another preferred embodiment of the above UHF RFID tag, the first portion of the antenna has a first real component value and a first imaginary component value and the second portion of the antenna has a second real component value and a second imaginary component value, and the second portion of the antenna is selected to provide a second real component value and second imaginary component value which assist in balancing the first real component value and the first imaginary component value to provide the second impedance value of the antenna substantially similar to the first impedance value of the integrated circuit. In another aspect of this embodiment, the first portion of the antenna has a first real component value and a first imaginary component value and the second portion of the antenna has a second real component value and a second imaginary component value, the second portion of the antenna is selected to provide a second real component value and second imaginary component value which assist in balancing the first real component value and the first imaginary component value to provide the second impedance value of the antenna equal to the first impedance value of the integrated circuit.

In another preferred embodiment of the above UHF RFID tag, the first portion of the second antenna element and the second portion of the second antenna element are in the shape of closed loops. In another preferred embodiment of the above UHF RFID tag, the first portion of the second antenna element and the second portion of the second antenna element are in the shape of polygons. In yet another preferred embodiment of the above UHF RFID tag, the first portion of the second antenna element is dissimilar in shape to the second portion of the second antenna element.

In another preferred embodiment of the above UHF RFID tag, the first portion of the second antenna element is similar in shape to the second portion of the second antenna element. In yet another preferred embodiment of the above UHF RFID tag, the first portion of the second antenna element is different in size than the second portion of the second antenna element. In another preferred embodiment of the above UHF RFID tag, the first conductor and second conductor include meanders. In another preferred embodiment of the above UHF RFID tag, the first conductor and second conductor are made from a wire, patterned conductive foils, or printed conductive traces. In another preferred embodiment of the above UHF RFID tag, the first antenna element is made from a different conductive material than the second antenna element.

In yet another preferred embodiment of the above UHF RFID tag, the dielectric substrate includes a dielectric constant $\epsilon \leq 10^*\epsilon_0$ between 850 MHz and 960 MHz, where $\epsilon_0$ is the permittivity of free space ($\epsilon_0 = 8.85 \times 10^{-12} C^2/N, m^2$). In another preferred embodiment of the above UHF REID tag, the dielectric substrate includes a first side and a second side opposite the first side, where the antenna is attached to the first side and the integrated chip is attached to the second side. In another preferred embodiment of the above UHF RFID tag, the distance between the first portion of the second antenna element and the first conductor is different from the distance between the second portion of the second antenna element and the second conductor. In another preferred embodiment of the above UHF RFID tag, the length of the first conductor is different than the length of the second conductor.

Another aspect of the present invention provides a method of manufacturing an ultra high frequency ("UHF") radio frequency identification ("RFID") tag. This method comprises the steps of: a) providing a dielectric substrate; b) selecting an antenna comprised of a first antenna element and a second antenna element, where the first antenna element is selected to provide a desired operating frequency range of the antenna, where the second antenna element is selected to provide a desired impedance value, where the first antenna element comprises a first conductor and a second conductor, where each conductor has a first end and a second end opposite the first end, and where the second antenna element comprises a first portion and a second portion; and c) attaching the antenna to the dielectric substrate such that the first portion of the second antenna element is attached to the second end of the first conductor and the second portion of the second antenna element is attached to the second end of the second conductor; and d) attaching an integrated circuit to the first end of the first conductor and the first end of the second conductor.

In one preferred embodiment of the above method, the integrated circuit has a first impedance value, and the second antenna element has a second impedance value, the magnitude of the real component of the second impedance value is substantially similar to the magnitude of the real component of the first impedance value, the magnitude of the imaginary component of the second impedance value is substantially similar to the magnitude of the imaginary component of the first impedance value, and the phase of the imaginary component of the first impedance value and phase of the imaginary component of the second impedance value are opposite. In another aspect of this embodiment, the first impedance value has a first real component value and a first imaginary component value, the second impedance value has a second real component value and a second imaginary component value, the first real component value is substantially similar to the second real component value and the first imaginary component value is substantially similar to the second imaginary component value, the magnitude of the imaginary component of the second impedance value is substantially similar to the magnitude of the imaginary component of the imaginary component of the first impedance value, and the phase of the imaginary component of the first impedance value and phase of the imaginary component of the second impedance value are opposite. In another aspect of this embodiment, the first impedance value has a first real component value and a first imaginary component value, where the second impedance value has a second real component value and a second imaginary component value, the first real component value is equal to the second real component value and the first imaginary component value is equal to the second imaginary component value, the magnitude of the imaginary component of the second impedance value is equal to the magnitude of the imaginary component of the imaginary component of the first impedance value, and the phase of the imaginary component of the first impedance value and phase of the imaginary component of the second impedance value are opposite.

In another preferred embodiment of the above method, the first portion of the antenna has a first real component value and a first imaginary component value and the second portion of the antenna has a second real component value and a second imaginary component value, the second portion of the antenna is selected to provide a second real component value and second imaginary component value which assist in balancing the first real component value and the first imaginary component value to provide the second impedance value of the antenna substantially similar to the first impedance value of the integrated circuit. In another aspect of this embodiment, the first portion of the antenna has a first real component value and a first imaginary component value and the second portion of the antenna has a second real component value and a second imaginary component value, the second portion of the antenna is selected to provide a second real component value and second imaginary component value which assist in balancing the first real component value and the first imaginary component value to provide the second impedance value of the antenna equal to the first impedance value of the integrated circuit.

In another preferred embodiment of the above method, the first portion of the second antenna element and the second portion of the second antenna element are in the shape of closed loops. In another preferred embodiment of the above method, the first portion of the second antenna element and the second portion of the second antenna element are in the shape of polygons. In yet another preferred embodiment of the above method, the first portion of the second antenna element is dissimilar in shape to the second portion of the second antenna element. In another preferred embodiment of the above method, the first portion of the second antenna element is similar in shape to the second portion of the second antenna element. In another preferred embodiment of the above method, the first portion of the second antenna element is different in size than the second portion of the second antenna element.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
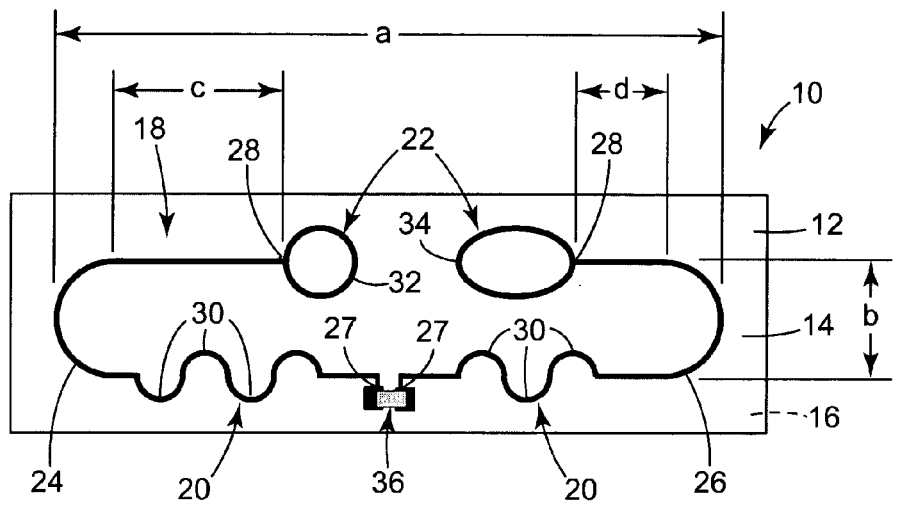
FIG. 1 is a top view of one embodiment of the RFID tag of the present invention.

The present invention is useful for radio frequency identification ("RFID") tags operating in the ultra high frequency ("UHF") band, which generally ranges from 850 MHz to 960 MHz; preferably 868 MHz for Europe, 915 MHz for the USA, and 956 MHz for Japan.

RFID tags may be either active or passive. Passive RFID tags, particularly those operating in the UHF band, use radio frequency signals from an incident electromagnetic field sent out by an RFID reader to power the tag. The radio frequency reader may provide an interface between a data management system and the RFID tag, or between the user and the RFID tag. When the RFID tag receives the radio frequency signal from the incident electromagnetic field, the antenna absorbs the radio frequency energy received from the radio frequency signal and directs the energy to the integrated circuit on the RFID tag. The integrated circuit converts some portion of the absorbed radio frequency energy into electrical potential energy and stores this energy in a section of the internal circuitry of the integrated circuit. The electrical potential energy appears as a voltage at the internal power supply connections in the integrated circuit. The other circuits in the integrated circuit, including the microprocessor, optional memory, and decoding and encoding circuits for communications are powered by this stored energy.

The incident electromagnetic energy from the RFID Reader may contain data or instructions encoded into the radio frequency signal. The instructions may include commands to the RFID tag to communicate its serial number or the contents of data registers in the integrated circuit. Using the energy stored on the integrated circuit, the integrated circuit can then communicate back to the RFID reader the details of data stored in the integrated circuit's on-board memory. The distance at which an RFID tag can be "read", i.e., participate in two-way communication with the RFID Reader, depends on the output power of the RFID reader, the surrounding environment, and the efficiency with which the RFID tag interacts with the incident electromagnetic field. The range at which the RFID tag can "write" new data to its memory is generally less than the "read" range, because of the generally higher voltages required for a "write" operation. For UHF RFID tags in particular, the RFID tag communicates with the RFID reader by modulating the load on the RFID antenna, causing a portion of the incident electromagnetic energy to be back-scattered to the RFID reader. The reader receives the back-scattered electromagnetic radiation and decodes the modulated signal.

With RFID reader power emission limited by government regulations, improved read range will most likely only be possible with more efficient tag antenna designs. Therefore, increased efficiency of the antenna absorption of the incident radio frequency energy and transfer of the absorbed energy to the integrated circuit is desired. A UHF RFID tag antenna should be efficient to absorb the incident electromagnetic radiation and to back-scatter electromagnetic radiation back to the RFID reader. Furthermore, the connection between the RFID tag antenna and the integrated circuit needs to be efficient to supply sufficient energy to the integrated circuit, even at the upper limit of the operating distance, i.e., at large distances separating the RFID reader and RFID tag, for example three meters.

The efficiency of the interaction of the electromagnetic field with the RFID tag depends on the RFID tag antenna design and the efficiency of coupling the electromagnetic energy from the antenna into the integrated circuit. This efficiency is related to the impedance of the antenna and the impedance of the integrated circuit. Moderately efficient UHF antennas can be made from dipoles or two conductors, preferably on the order of one-half wavelength. At 900 MHz, the free space wavelength is approximately 300 mm. Efficient coupling of electromagnetic energy between the antenna and the integrated circuit depends on substantially matching or exactly matching the impedance of the antenna to the impedance at the input connections of the integrated circuit. The impedance Z can be represented by a complex number, in which the real component (represented as Re Z) represents resistive loads where a time-varying current in phase with the voltage ($\phi=0$, where $\phi$ is defined as the phase angle between the voltage and current waveforms) leads to a dissipative (resistive) loss function. The imaginary component (represented as Im Z) represents a time-varying voltage that leads ($\phi=\pi/2$, inductive) or lags ($\phi=-\pi/2$, capacitive) the time-varying current in the restricted load by the characteristic phase angle $\phi$. The complex impedance of the antenna and the complex impedance of the integrated circuit can be represented by a sum of a real component and of an imaginary component. The complex representations of impedance, voltage, and current may be manipulated using the customary mathematical rules for complex variables.

Efficient coupling of electromagnetic energy across the input connections between the antenna and integrated circuit is achieved by designing the real component of the antenna impedance (Re $Z_{ANT}$) to be close to, and preferably equal to, the real component of the integrated circuit input impedance (Re $Z_{IC}$). Matching the real components of the antenna and integrated circuit input impedance will help minimize reflection of electromagnetic energy at the boundary between the antenna and integrated circuit connection points, making the RFID tag more efficient. This phenomenon is taught in *The Art of Electronics*, by Paul Horowitz and Winfield Hill (Cambridge University Press, Cambridge, England) 1980, pp. 565–568, which is hereby incorporated by reference.

In various operating frequency bands including in particular UHF operating bands, the imaginary impedance of the antenna and the imaginary impedance of the integrated circuit (Im $Z_{ANT}$ and Im $Z_{IC}$, respectively) will affect the efficiency of power transfer into the integrated circuit. The term "power factor" is used to characterize the efficiency with which the absorbed radio frequency electromagnetic energy sent by the RFID reader absorbed by the antenna will be converted into stored energy in the integrated circuit. (The definition and explanation of power factor is further discussed in *The Art of Electronics*, by Paul Horowitz and Winfield Hill (Cambridge University Press, Cambridge, England) 1980, pp. 29 which is hereby incorporated by reference.) The power factor is at a maximum when the current and voltage are in phase, which can be achieved by balancing the imaginary (capacitive) impedance component of the integrated circuit input with the imaginary (inductive) impedance component of the antenna.

The operation of a simple dipole antenna is well understood by those skilled in the art and may be described by Maxwell's equations. Simple dipole antennas are further discussed in *Elements of Physics*, by George Shortley and Dudley Williams, Prentice-Hall, Inc., Englewood Cliffs, N.J. (1971), which is hereby incorporated by reference. The overall physical length of a dipole antenna may be decreased using meanders 30, which are curved portions or a circuitous circuit path along the dipole antenna to increase the effective electrical length (signal path) of the dipole antenna, while maintaining a preferred physical length. The meanders may be uniform or non uniform.

Another variation of the dipole antenna, which is also well known in the art, is the folded dipole, where the two free distal ends extending of opposite the integrated circuit are folded back on themselves and are electrically connected. The impedance of an example folded dipole antenna, where the length of the straight section of the folded dipole antenna is 140 mm, is calculated to be:

$$Z_{FOLDED\ DIPOLE}(l_0=140\ mm)=(24.58\Omega, -j\ 13.93\ \Omega)\ at\ f=915\ MHz,$$

where $l_0$ is the end-to-end length of the straight section in the folded dipole antenna. The calculation was performed using NEC (Numerical Electromagnetics Code) Win-Pro, which is commercially available from Nittany Scientific located in Riverton, Utah. If the length of this example folded dipole is reduced effective in length by 1%, calculations show that the impedance shifts to:

$$Z_{FOLDED\ DIPOLE}(l=0.99*l_0)=(4.83\ \Omega, -j\ 8.635\ \Omega)\ at\ f=915\ MHz.$$

This large shift in calculated antenna impedance for a relatively small shift in the folded dipole physical characteristic length illustrates the sensitivity of the folded dipole antenna to small variations in its overall length.

The RFID tag of the present invention provides antenna designs that efficiently couples radio frequency power received by the antenna to the RFID integrated circuit, particularly those RFID tags operating in the UHF operating band. The antenna design is compact, making it suitable for RFID labels or similar applications where it is desirable to minimize the overall RFID tag size. The antenna design may be easily modified to assist in matching and balancing the complex antenna impedance and the complex input impedance of the integrate circuit at the selected operating frequency.

FIG. 1 illustrates one embodiment of the inventive RFID tag 10. The RFID tag 10 is especially useful in the UHF ranges, and hence, may be an UHF RFID tag 10. The RFID tag 10 includes a dielectric substrate 12 having a first side 14 and a second side 16 opposite the first side 16. Antenna 18 is attached to the first side 14 of the dielectric substrate 12. Preferably, antenna 18 is attached to the dielectric substrate 12 by any means know in the art, for example, by lamination with a pressure sensitive, curable adhesive film or by direct deposition on the substrate. The RFID tag 10 also includes an integrated circuit 36 attached to the first side 14 of the dielectric substrate 12. Preferably, the integrated circuit 36 is attached to the dielectric substrate 12 by any means know in the art, for example, by anisotropic conductive film adhesive, solder, or thermo-compression bonding.

The antenna 18 includes a first antenna element 20 and a second antenna element 22. The first antenna 20 preferably is a dipole antenna including a first conductor 24 and a second conductor 26. In one preferred embodiment, the conductors 24, 26 include meanders 30. Meanders 30 help decrease the overall physical length of the dipole antenna and assist in increasing the electrical length (signal path). Each conductor 24, 26 includes a first end 27 and a second end 28 opposite the first end 27. The second antenna element includes a first portion 32 and a second portion 34. In one preferred embodiment, the first portion 32 and the second portion 34 are in the shape of closed loops or polygons. In one example, as illustrated in FIG. 1, the first portion 32 may be in the shape of a circle and the second portion 34 may be in the shape of an ellipse. However, the portions 32, 34 of the second antenna element may be any shape. The portions 32, 34 of the second antenna element may be shaped similarly, or the same. The portions 32, 34 of the second antenna element may be sized to be similar in size, or different in size. However, the shape and size of the portions 32, 34 of the second antenna element may be selected by one skilled in the art to assist in balancing the impedance of the antenna 18 with the impedance of the integrated circuit 36, as discussed below.

The first end 27 of the conductors 24, 26 are electrically connected to the integrated circuit 36, preferably by individual terminal pads (not shown). In one preferred embodiment, the second end 28 of the first conductor 24 is attached or is electrically connected to the first portion 32 of the second antenna element 22 and the second end 28 of the second conductor 26 is attached or electrically connected to the second portion 34 of the second antenna element 22. The length "c" measured between the second end 28 of the first conductor 24 and the curved portion of the first conductor 24 (as illustrated in FIG. 1) may be equal to or different than the length "d" measured between the second end 28 of the second conductor 26 and the curved portion 3 of the second conductive 24. The lengths c and d respectfully, may be selected by one skilled in the art to assist in balancing the impedance of the antenna 18 with the impedance of the integrated circuit 36, as discussed below.

To tune the operating frequency band of the RFID antenna 18, the length of first conductor 24 and second conductor 26, which make up the first antenna element 20, may be modified. By selecting the length of the first conductor 24 and the second conductor 26, the first antenna element 20 may be selected to determine the operating frequency range of the antenna 18 of the RFID tag 10. The lengths of the conductors 24, 26 may be the same or different. Preferred lengths of the conductors 24, 26 are in the range of 85 mm. to 170 mm., and more preferred lengths of the conductors 24, 26 are approximately 140 mm.

The design of the first antenna element 20 also assists in matching the real part of the impedance of the antenna 18 to the real part of the input impedance of the integrated circuit 36. The design of the first antenna elements 20 provide a means by which the real part of the impedance of the antenna 18 may be increased, or decreased if so desired, to substantially match or equal the range of integrated circuit 36 input impedance.

The design of the second antenna elements 22 assists in modifying the current distribution at the second ends 28 of the first and second conductors 24, 26 of the first antenna element 20. By modifying the current distribution at the second ends 28 of the conductors 24, 26, the second antenna elements modify the imaginary component of the impedance of the antenna 18 to balance the imaginary component of the input impedance of the integrated circuit 36. When the real impedance of the antenna 18 and the integrated circuit 36 are substantially matched and the imaginary impedance components of the antenna 18 and integrated circuit 36 are balanced, the radio frequency energy absorbed by the antenna is efficiently transferred from the antenna 18 into the integrated circuit 36.

At the second end 28 of each conductor 24, 26, a second antenna element 22 is electrically connected to the second end 28 of the conductors 24, 26. To help balance the capacitive reactance of the integrated circuit 36, the first portion 32 and second portion 34 of the second antenna elements 22 are selected to introduce a primarily inductive reactance into the antenna 18 impedance and an associated phase shift in the radio frequency signal. The second antenna elements 22 may also have some minor portion of associated capacitive reactance, but the net inductive impedance of the second antenna elements 22 assists in balancing the capacitive impedance of the integrated circuit. The portions 32, 34 of the second antenna elements 22 may be in the form of closed loops with circumference ranging from as small as ⅛ the wavelength of the radio frequency signal to as large as ½ the wavelength of the radio frequency signal. The magnitude of the effect of the second antenna element 22 impedance is determined by the distribution of electrical currents along the length of the first portion 20 of the antenna 18 and at the second end 28 of each conductor 24, 26. The presence of the second antenna element 22 assists in modifying the boundary conditions for the electrical currents, compared to the current distribution in dipole antennas known in the prior art. The modified boundary conditions introduce an additional phase shift in the current distribution in the antenna, compared to the phase shifts of dipole antennas known in the prior art. The phase shifts in the electrical current distribution introduced by second antenna element 22 have the effect of modifying the reflection of radio frequency energy at the second ends 28 of the first antenna element 20, compared to the dipole antenna known in the prior art. By selecting the second antenna elements 22 based on the teachings of this specification, the imaginary component of the antenna 18 impedance can be selected to be inductive, thereby balancing the (capacitive) imaginary component of the integrated circuit 36.

The design of the antenna 18 assists in matching the real part of the antenna impedance, Re $Z_{ANT}$, to the real component of the integrated circuit input impedance, Re $Z_{IC}$ to assist in efficiently coupling the radio frequency signal from the antenna 18 to the integrated circuit 36. The imaginary part of the antenna 18 impedance, Im $Z_{ANT}$, balances the imaginary part of the integrated circuit 36 input impedance, Im $Z_{IC}$, but is preferably opposite in phase. Under these conditions of matched and balanced impedance components, the radio frequency power absorbed by the antenna 18 couples efficiently to the integrated circuit.

On embodiment of preferable operating conditions of the RFID tag 10 are summarized a follows:

Re $Z_{IC} \approx$ Re $Z_{ANT}$ and

|Im $Z_{IC}$|≈|Im $Z_{ANT}$|, with $\phi(Z_{IC}) \approx -\phi(Z_{ANT})$, where $\phi$ is the phase angle of the complex impedance.

Even if it is not possible to exactly match the antenna 18 complex impedance to the integrated circuit input complex impedance at the RFID operating frequency, a substantially or approximately close impedance match at the operating frequency will result in more efficient coupling of the antenna 18 to the integrated circuit 36, compared to a poor match.

Figure 2:
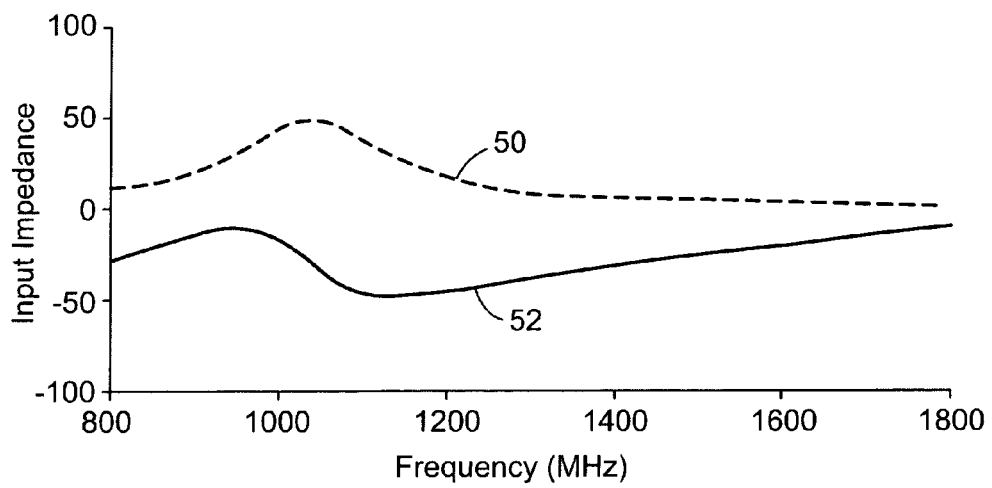
FIG. 2 is a graph illustrating the calculated impedance of a prior art folded dipole antenna.

FIG. 2 is a graph illustrating the calculated impedance of a prior art folded dipole antenna having a diopole length (distance a of 140 mm and a end length (distance b) of 10 mm. The line 50 plots the real component Re $Z_{ANT}$ of the antenna impedance as a function of frequency. The line 52 plots the imaginary component, Im $Z_{ANT}$, of the antenna impedance as a function of frequency. Note the values for Re $Z_{ANT}$ and Im $Z_{ANT}$ given for a radio frequency range of 915 MHz; at 915 MHz, $Z_{PRIOR\ ART\ DIPOLE\ ANT}$=(24.6 Ω, –j 13.6 Ω).

FIG. 2 shows the calculated values of the real and imaginary components of the complex impedance of a prior art folded loop dipole antenna. The calculations were performed using an antenna modeling program (NEC: Numerical Electromagnetics Code, available commercially as NEC WINPro from Nittany Scientific, Inc.). Note that the complex impedance at 915 MHz is approximately (24.575 Ω–j13.93 Ω). Near the radio frequency of interest (915 MHz), the prior art folded dipole antenna shows a small real impedance (resistive) component and a small imaginary impedance component with negative (i.e., capacitive) phase. The small magnitude of the real (24 Ω resistive) component of the folded dipole impedance does not match the larger real (65 Ω resistive) component of the integrated circuit input impedance. The small magnitude (13.93 Ω capacitive) of the imaginary component of the folded dipole impedance does not match the larger magnitude (720 Ω capacitive) of the imaginary component of the integrate circuit input impedance. The phase (–j, capacitive) of the imaginary component of the folded dipole impedance is the same as the phase of the phase (–j, capacitive) of the imaginary component of the integrated circuit input impedance. Therefore, the imaginary component of the folded dipole antenna is not balance the imaginary component of the integrated circuit input impedance so as to substantially offset (cancel) one against the other. Under these conditions of mismatched real components and unbalanced imaginary components of the antenna and integrated circuit impedances, the electromagnetic signal absorbed by the antenna will couple to the integrated circuit with low efficiency i.e. low power transfer.

Figure 3:
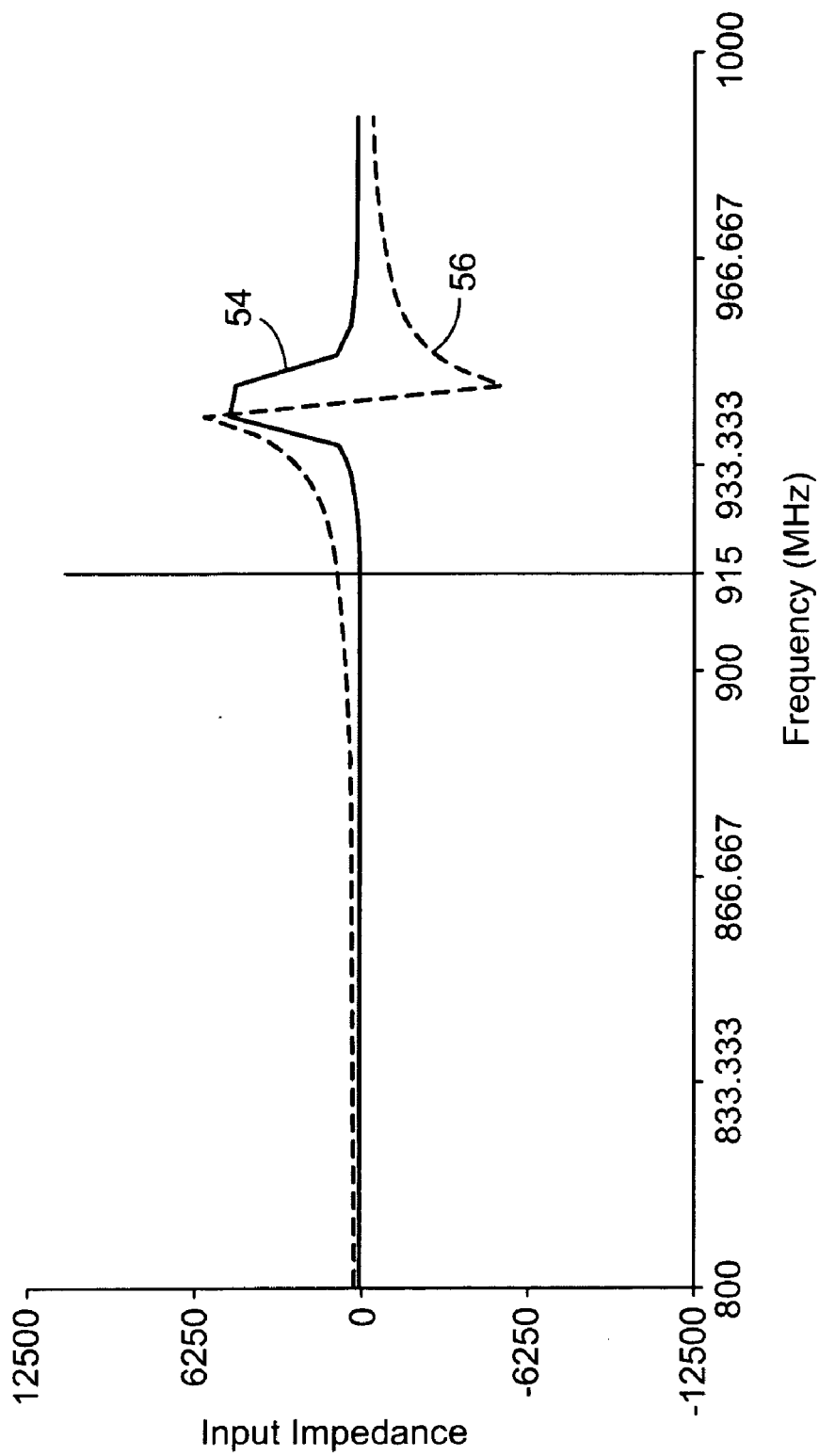
FIG. 3 is a graph illustrating the calculated impedance of the antenna of the RFID tag of the present invention.

FIG. 3 is a graph illustrating the calculated impedance of the antenna 18 of the RFID tag of the present invention, where distance a equaled 140 mm and distance b equaled 10 mm. Note that the scale of this graph is different from the scale of the graph in FIG. 2, so that the larger impedance values characteristic of the antenna design of the present invention can be more clearly displayed. The line 54 plots the real component Re $Z_{ANT}$ of the antenna 18 impedance as a function of frequency. The line 56 plots the imaginary component, Im $Z_{ANT}$, of the antenna 18 impedance as a function of frequency. Note the values for Re $Z_{ANT}$ and Im $Z_{ANT}$ given for a frequency of 915 MHz:; $Z_{PRESENT\ INVENTION\ DIPOLE\ ANT}$=(67.0 Ω+j 751.5 Ω). The calculations were performed using the antenna modeling program mentioned above (NEC: Numerical Electromagnetics Code.) Near the radio frequency of interest (915 MHz), the antenna 18 shows a real (resistive) impedance component and an imaginary impedance component with positive (i.e., inductive) phase. The magnitude of the real (67 Ω resistive) component of the impedance of the inventive antenna of this example approximately matches the real (65 Ω resistive) component of the integrated circuit 36 input impedance. The magnitude (751 Ω inductive) of the imaginary component of the impedance at the inventive antenna of this example approximately matches the magnitude (720 Ω capacitive) of the imaginary component of the integrated circuit 36 input impedance. The phase (+j, inductive) of the imaginary component of the impedance of the inventive antenna of this example is opposite to the phase (–j, capacitive) of the imaginary component of the integrated circuit 36 input impedance. The imaginary component of the impedance/inventive antenna of this example and the integrated circuit 36 input impedance approximately balance, so as to substantially offset (or cancel) each other. In this preferred mode of matched real components and balanced imaginary components of the antenna 18 and integrated circuit 36 impedances, the electromagnetic signal absorbed by the antenna 18 will antenna couple to the integrated circuit 36 with high efficiency, as compared to the prior folded dipole antenna discussed above related to FIG. 2.

The dielectric substrate 12 may be any dielectric material known in the art. Examples of suitable dielectric materials for substrate 12 include polyethylene terephthalate (commonly known as polyester or PET), polyethylene naphthanate (commonly known as PEN), copolymers of PET and PEN, polyimide, and polypropylene. Preferably, the thickness of the dielectric substrate 12 is in the range of 0.010 mm to 0.200 mm, and more preferably, within the range of 0.025 mm to 0.100 mm. However, the dielectric substrate may be any thickness and may even be a non-uniform thickness.

An example of a suitable integrated circuit 36 is commercially available from Philips Semiconductors, based in Eindhoven, Netherlands, under the part number SL3ICS30.

The antenna 18 may be made of any type of conductive material, such a wire, a conductive metal pattern (such as those formed from metal foils such as etched aluminum, etched copper, plated copper and the like), a printed conductive pattern (such as those made from conductive inks, or other metal-containing materials, optionally including process steps to improve conductivity), a pressed copper powder (for example as disclosed in published U.S. Patent Application 2003/0091789, which is hereby incorporated by reference), printed or pressed graphite or carbon black, or other conductive materials known to those skilled in the art.

The antenna 18 shown in FIG. 1 is a dipole antenna with a first conductor 24 and a second conductor 26. However, other well-known antennas known in the art may be used in combination with the second antenna element 22, for example, a folded dipole, a spiral antenna, a "z-shaped" antenna, a loop antenna or their complements, such as slot antennas.

The operation of the present invention will be further described with regard to the following detailed examples. These examples are offered to further illustrate the various specific and preferred embodiments and techniques. It should be understood, however, that many variations and modifications may be made while remaining within the scope of the present invention.

EXAMPLES

One preferred embodiment of the RFID tag 10 of the present invention was made, as illustrated in FIG. 1. The dimensions of the antenna 18 are illustrated in FIG. 1, and the antenna of this example included an "a" distance of 140 mm and a "b" distance of 10 mm. A comparative example of a prior art folded dipole antenna was also made.

The antenna 18 was made by plating 0.118 mm thickness copper on a 0.025 mm thick polyimide substrate 12 commercially available from Dupont Electronics, based in Wilmington, Del., under the trade name Kapton E film. Photoresist material commercially available from MacDermid, Inc, based in Wilmington, Del. under trade name MacDermid SF 320 was laminated to the surface of the plated copper film. The photoresist material was applied to the substrate, in the form of the desired final antenna 18.

The exposed copper was etched away, leaving copper in the pattern of the desired final antenna 18. The remaining photoresist material was stripped off the copper, using the methods suggested by the photoresist manufacturer. After stripping the photoresist material, the patterned copper antenna 19 in its final form was left on the polyimide substrate 12. The resultant 0.018 mm copper traces were of the same thickness as the starting copper foil thickness. The copper traces were 1.000 mm wide, except for the two short traces connected to the integrated circuit connection pads; these two traces were 0.100 mm wide. The integrated circuit was connected to the ends 27.

The antenna 20 had an 'a' dimension of 140 mm with a 'b' dimension of 10 mm. The first portion of the second antenna element was formed as a circle with a radius of 5 mm and attached to end 28 of the first conductor 24, with a 'c' dimension of 4 mm. The second portion of the second antenna element was formed as a circle with a radius of 5 mm attached to the end 28 of the second conductor 26, with a 'd' dimension of 58 mm.

An integrated circuit 36 commercially available from Philips Semiconductors, based in Eindhoven, Netherlands, under the part number SL3ICS30 was attached to the polyimide substrate 12 by anisotropic conductive film adhesive. This integrated circuit 36 had known input impedance characteristics of $Z_{IC}=(65\ \Omega-j\ 720\ \Omega)$ at 915 MHz.

The comparative example antenna was formed using the same procedures and of the same dimensions as the inventive antenna described above except the comparative antenna had no second antenna elements and the ends 28 joined.

Since means of measuring the real and imaginary antenna impedance provides questionable results because the measuring means loads the antenna, thus affecting the measured values, a preferred means to evaluate balance between the complex impedance of the antenna and the IC is to measure read distance. A greater read distance is indicative of closer balanced impedances.

The read distance of the inventive UHF RFID tag 10 was measured with a 915 MHz RFID reader, commercially available from SAMSys Technologies, Richmond Hill, Ontario, Canada, under the trade name SAMSYS, part number MP9320, operated at 1 watt output power. The RFID reader was connected to a circular polarized antenna, commercially available from Cushcraft Corporation, Manchester, N.H., under the trade name CUSHCRAFT, part number S9028PC.

The read distance of the comparison example of the simple dipole antenna, with same model Philips integrated circuit model SL3ICS30 was less than 0.3 m. The read distance of the example inventive UHF RFID tag 10 was 1.5 m.

TABLE 1

Real and Imaginary Components of Impedance of the Integrated Circuit, Comparative Example, and Example of the Present Invention

| | | Impedance (Z) | |
| --- | --- | --- | --- |
| | Frequency MHz | Re Z Ohms (Ω) | Im Z Ohms (Ω) |
| Integrated Circuit | 915 | 65.0 | −j 720 |
| Comparative Example (Prior Art Folded Dipole) | 915 | 24.6 | −j 13.9 |
| Example 1 | 900 | 31.9 | +j 513.0 |
| | 915 | 67.0 | +j 751.4 |

The tests and test results described above are intended solely to be illustrative, rather than predictive, and variations in the testing procedure can be expected to yield different results.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A radio frequency identification ("RFID") tag, comprising:
   a) a dielectric substrate;
   b) an antenna attached to the dielectric substrate, wherein the antenna comprises:
      i) a first antenna element, wherein the first antenna element comprises a first conductor and a second conductor, wherein each conductor has a first end and a second end opposite the first end; and
      ii) a second antenna element, wherein the second antenna element comprises a first portion and a second portion in the shape of closed loops, wherein the first portion is attached to the second end of the first conductor and the second portion is attached to the second end of the second conductor; and
   c) an integrated circuit attached to the first end of the first conductor and the first end of the second conductor.

2. A radio frequency identification ("RFID") tag, comprising:
   a) a dielectric substrate;
   b) an antenna attached to the dielectric substrate, wherein the antenna comprises:
      i) a first antenna element, wherein the first antenna element comprises a first conductor and a second conductor, wherein each conductor has a first end and a second end opposite the first end; and
      ii) a second antenna element, wherein the second antenna element comprises a first portion and a second portion, wherein the first portion is attached to the second end of the first conductor and the second portion is attached to the second end of the second conductor; and
   c) an integrated circuit attached to the first end of the first conductor and the first end of the second conductor, wherein the integrated circuit has a first impedance value, and wherein the antenna has a second impedance value, and wherein the magnitude of the real component of the second impedance value is substantially similar to the magnitude of the real component of the first impedance value, and the magnitude of the imaginary component of the second impedance value is substantially similar to the magnitude of the imaginary component of the first impedance value, and wherein the phase of the imaginary component of the first impedance value and the phase of the imaginary component of the second impedance value are opposite.

3. The RFID tag of claim 2, wherein the first impedance value has a first real component value and a first imaginary component value, wherein the second impedance value has a second real component value and a second imaginary component value, wherein the first real component value is equal to the second real component value and wherein the magnitude of the imaginary component of the second impedance value is equal to the magnitude of the imaginary component of the imaginary component of the first impedance value, and wherein the phase of the imaginary component of the first impedance value and the phase of the imaginary component of the second impedance value are opposite.

4. The RFID tag of claim 2, wherein the first portion of the antenna has a first real component value and a first imaginary component value and the second portion of the antenna has a second real component value and a second imaginary component value, and wherein the second portion of the antenna is selected to provide a second real component value and second imaginary component value which assist in balancing the first real component value and the first imaginary component value to provide the second impedance value of the antenna substantially similar to the first impedance value of the integrated circuit.

5. The RFID tag of claim 4, wherein the first portion of the antenna has a first real component value and a first imaginary component value and the second portion of the antenna has a second real component value and a second imaginary component value, and wherein the second portion of the antenna is selected to provide a second real component value and second imaginary component value which assist in balancing the first real component value and the first imaginary component value to provide the second impedance value of the antenna equal to the first impedance value of the integrated circuit.

6. The RFID tag of claim 1, wherein the first portion of the second antenna element is similar in shape to the second portion of the second antenna element.

7. The RFID tag of claim 1, wherein the first portion of the second antenna element is different in size than the second portion of the second antenna element.

8. The RFID tag of claim 1, wherein the first conductor and second conductor include meanders.

9. The RFID tag of claim 1, wherein the first conductor and second conductor are made from a wire, patterned conductive foils, or printed conductive traces.

10. The RFID tag of claim 1, wherein the first antenna element is made from a different conductive material than the second antenna element.

11. The RFID tag of claim 1, wherein the dielectric substrate includes a dielectric constant $\in \leq 10^* \in_0$ between 850 MHz and 960 MHz, wherein $\in_0$ is the permittivity of free space ($\in_0 = 8.85 \times 10^{-12} C^2/N.m^2$).

12. The RFID tag of claim 1, wherein the dielectric substrate includes a first side and a second side opposite the first side, wherein the antenna is attached to the first side and the integrated chip is attached to the second side.

13. The RFID tag of claim 1, wherein the distance between the first portion of the second antenna element and a curved portion of the first conductor is different from the distance between the second portion of the second antenna element and a curved portion of the second conductor.

14. The RFID tag of claim 1, wherein the length of the first conductor is different than the length of the second conductor.

15. A radio frequency identification ("RFID") tag, comprising:
   a) a dielectric substrate;
   b) an antenna attached to the dielectric substrate, wherein the antenna comprises:
      i) a first antenna element, wherein the first antenna element comprises a first conductor and a second conductor, wherein each conductor has a first end and a second end opposite the first end; and ii) a second antenna element, wherein the second antenna element comprises a first portion and a second portion, wherein the first portion is attached to the second end of the first conductor and the second portion is attached to the second end of the second conductor; and c) an integrated circuit attached to the first end of the first conductor and the first end of the second conductor, wherein the first portion of the second antenna element and the second portion of the second antenna element are in the shape of polygons.

16. A radio frequency identification ("RFID") tag, comprising:

a) a dielectric substrate;

b) an antenna attached to the dielectric substrate, wherein the antenna comprises:

i) a first antenna element, wherein the first antenna element comprises a first conductor and a second conductor, wherein each conductor has a first end and a second end opposite the first end; and ii) a second antenna element, wherein the second antenna element comprises a first portion and a second portion, wherein the first portion is attached to the second end of the first conductor and the second portion is attached to the second end of the second conductor; and c) an integrated circuit attached to the first end of the first conductor and the first end of the second conductor, wherein the first portion of the second antenna element is dissimilar in shape to the second portion of the second antenna element.

17. A method of manufacturing an ultra high frequency ("UHF") radio frequency identification ("RFID") tag, comprising the steps of:

a) providing a dielectric substrate;

b) selecting an antenna comprised of a first antenna element and a second antenna element, wherein the first antenna element is selected to provide a desired operating frequency range of the antenna, wherein the second antenna element is selected to provide a desired impedance value, wherein the first antenna element comprises a first conductor and a second conductor, wherein each conductor has a first end and a second end opposite the first end, and wherein the second antenna element comprises a first portion and a second portion in the shape of closed loops; and c) attaching the antenna to the dielectric substrate such that the first portion of the second antenna element is attached to the second end of the first conductor and the second portion of the second antenna element is attached to the second end of the second conductor; and d) attaching an integrated circuit to the first end of the first conductor and the first end of the second conductor.

18. The method of claim 17, wherein the integrated circuit has a first impedance value, and wherein the antenna has a second impedance value, and wherein the magnitude of the real component of the second impedance value is substantially similar to the magnitude of the real component of the first impedance value, and the magnitude of the imaginary component of the second impedance value is substantially similar to the magnitude of the imaginary component of the first impedance value, and wherein the phase of the imaginary component of the first impedance value and phase of the imaginary component of the second impedance value are opposite.

19. The method of claim 18, wherein the first impedance value has a first real component value and a first imaginary component value, wherein the second impedance value has a second real component value and a second imaginary component value, wherein the first real component value is equal to the second real component value and wherein the magnitude of the imaginary component of the second impedance value is equal to the magnitude of the imaginary component the first impedance value, and wherein the phase of the imaginary component of the first impedance value and the phase of the imaginary component of the second impedance value are opposite.

20. The method of claim 18, wherein the first portion of the antenna has a first real component value and a first imaginary component value and the second portion of the antenna has a second real component value and a second imaginary component value, and wherein the second portion of the antenna is selected to provide a second real component value and second imaginary component value which assist in balancing the first real component value and the first imaginary component value to provide the second impedance value of the antenna substantially similar to the first impedance value of the integrated circuit.

21. The method of claim 20, wherein first portion of the antenna has a first real component value and a first imaginary component value and the second portion of the antenna has a second real component value and a second imaginary component value, and wherein the second portion of the antenna is selected to provide a second real component value and second imaginary component value which assist in balancing the first real component value and the first imaginary component value to provide the second impedance value of the antenna equal to the first impedance value of the integrated circuit.

22. The method of claim 17, wherein the first portion of the second antenna element and the second portion of the second antenna element are in the shape of polygons.

23. The method of claim 17, wherein the first portion of the second antenna element is dissimilar in shape to the second portion of the second antenna element.

24. The method of claim 17, wherein the first portion of the second antenna element is similar in shape to the second portion of the second antenna element.

25. The method of claim 17, wherein the first portion of the second antenna element is different in size than the second portion of the second antenna element.

* * * * *

UNITED STATES PATENT AND TRADEMARK OFFICE
CERTIFICATE OF CORRECTION

PATENT NO. : 6,999,028 B2
DATED : February 14, 2006
INVENTOR(S) : Egbert, William C.

It is certified that error appears in the above-identified patent and that said Letters Patent is hereby corrected as shown below:

Column 3,
Line 16, delete "REID" and insert -- RFID --.

Column 9,
Line 62, delete "diopole" and insert -- dipole --.
Line 63, after "distance a" insert -- ) --.

Column 10,
Line 45, delete "MHz:;" and insert -- MHz; --.
Line 48, delete "Code.)" and insert -- Code). --.

Column 14,
Line 2, before "of the first" delete "of the imaginary component".

Column 16,
Line 17, after "component" insert -- of --.

Signed and Sealed this

Sixth Day of June, 2006

JON W. DUDAS
*Director of the United States Patent and Trademark Office*